United States Patent
Hart

(10) Patent No.: US 10,119,590 B2
(45) Date of Patent: Nov. 6, 2018

(54) END MEMBER ASSEMBLIES AS WELL AS GAS SPRING ASSEMBLIES AND SUSPENSION SYSTEMS INCLUDING SAME

(71) Applicant: Firestone Industrial Products Company, LLC, Indianapolis, IN (US)

(72) Inventor: Corey S. Hart, McCordsville, IN (US)

(73) Assignee: Firestone Industrial Products Company, LLC, Nashville, TN (US)

( * ) Notice: Subject to any disclaimer, the term of this patent is extended or adjusted under 35 U.S.C. 154(b) by 0 days.

(21) Appl. No.: 15/327,976

(22) PCT Filed: Jul. 21, 2015

(86) PCT No.: PCT/US2015/041317
§ 371 (c)(1),
(2) Date: Jan. 20, 2017

(87) PCT Pub. No.: WO2016/014520
PCT Pub. Date: Jan. 28, 2016

(65) Prior Publication Data
US 2017/0204929 A1 Jul. 20, 2017

Related U.S. Application Data

(60) Provisional application No. 62/027,225, filed on Jul. 21, 2014.

(51) Int. Cl.
*F16F 9/05* (2006.01)
*F16F 9/04* (2006.01)
(Continued)

(52) U.S. Cl.
CPC ............... *F16F 9/05* (2013.01); *B60G 11/27* (2013.01); *B60G 11/28* (2013.01); *F16F 9/0409* (2013.01);
(Continued)

(58) Field of Classification Search
CPC ........ B60G 11/28; B60G 17/08; B60G 15/12; F16F 9/0454; F16F 9/04; F16F 9/0472; F16F 9/05
See application file for complete search history.

(56) References Cited

U.S. PATENT DOCUMENTS 5,941,510 A * 8/1999 Grass ................. B60G 7/04
267/64.27
6,070,861 A * 6/2000 Ecktman ............. B60G 7/04
267/64.27
(Continued)

FOREIGN PATENT DOCUMENTS

DE 102011050103 11/2012
DE 102011051237 12/2012
(Continued)

OTHER PUBLICATIONS

International Search Report for corresponding PCT Application No. PCT/US2015/041317 dated Sep. 11, 2015.
(Continued)

*Primary Examiner* — Nicole T Verley
(74) *Attorney, Agent, or Firm* — Brian D. McAlhaney; Fay Sharpe LLP

(57) ABSTRACT

End member assemblies are dimensioned for securement to an end of a flexible spring member for forming gas spring assemblies. An end member assembly can include an end member body and at least one connector fitting. The end member body includes a base section and a cap section that are secured together at a single flowed-material joint. The base section and the cap section together at least partially define a reservoir chamber within the end member body. The at least one connector fitting is at least partially embedded within the end member body. Gas spring assemblies including at least one end member assembly and suspension
(Continued)

systems including at least one gas spring assembly are also included.

20 Claims, 5 Drawing Sheets

(51) Int. Cl.
    *F16F 9/43*         (2006.01)
    *B60G 11/27*      (2006.01)
    *B60G 11/28*      (2006.01)
    *F16F 9/34*         (2006.01)

(52) U.S. Cl.
    CPC ............ *F16F 9/0445* (2013.01); *F16F 9/052* (2013.01); *F16F 9/43* (2013.01); *B60G 2206/424* (2013.01); *F16F 9/057* (2013.01); *F16F 9/34* (2013.01); *F16F 2224/046* (2013.01); *F16F 2230/06* (2013.01)

(56) References Cited

U.S. PATENT DOCUMENTS

| | | | | |
|---|---|---|---|---|
| 2006/0220283 A1* | 10/2006 | Leonard | ................. | B60G 11/28 267/122 |
| 2006/0226586 A1* | 10/2006 | Levy | ..................... | B60G 11/28 267/64.27 |
| 2010/0127438 A1 | 5/2010 | Eise et al. | | |
| 2013/0193664 A1* | 8/2013 | Egolf | ..................... | B60G 11/22 280/124.157 |
| 2014/0167337 A1* | 6/2014 | Ramsey | .................. | F16F 9/057 267/124 |
| 2014/0239606 A1* | 8/2014 | Koeske | .................. | F16F 9/057 280/124.16 |
| 2016/0121681 A1* | 5/2016 | Rebernik | ............... | B60G 11/27 267/64.27 |
| 2016/0121682 A1* | 5/2016 | Leonard | ................. | F16F 9/049 280/124.161 |

FOREIGN PATENT DOCUMENTS

| | | | | |
|---|---|---|---|---|
| EP | 0914976 | 5/1999 | | |
| EP | 1300264 A2 * | 4/2003 | ............ | B60G 11/28 |
| EP | 2031268 | 3/2009 | | |
| WO | WO2009/015821 | 2/2009 | | |
| WO | WO2012/097354 | 7/2012 | | |
| WO | WO 2013/003844 | 1/2013 | | |
| WO | WO2013/053536 | 4/2013 | | |
| WO | WO2014/036316 | 3/2014 | | |
| WO | WO2014/194008 | 12/2014 | | |

OTHER PUBLICATIONS

Examination Report dated Feb. 19, 2018 for corresponding Australian Application No. 2015292796.

* cited by examiner

END MEMBER ASSEMBLIES AS WELL AS GAS SPRING ASSEMBLIES AND SUSPENSION SYSTEMS INCLUDING SAME

BACKGROUND

The subject matter of the present disclosure broadly relates to the art of gas spring devices and, more particularly, to end member assemblies having a single flowed-material joint and configured to include a reservoir chamber with an outer side wall including at least two outer side wall sections secured together by way of the single flowed-material joint. Gas spring assemblies can include such an end member assembly, and suspension systems can include one or more of such gas spring assemblies.

The subject matter of the present disclosure may find particular application and use in conjunction with components for wheeled vehicles, and will be shown and described herein with reference thereto. However, it is to be appreciated that the subject matter of the present disclosure is also amenable to use in other applications and environments, and that the specific uses shown and described herein are merely exemplary. For example, the subject matter of the present disclosure could be used in connection with gas spring assemblies of non-wheeled vehicles, support structures, height adjusting systems and actuators associated with industrial machinery, components thereof and/or other such equipment. Accordingly, the subject matter of the present disclosure is not intended to be limited to use in association with gas spring suspension systems of wheeled vehicles.

Wheeled motor vehicles of most types and kinds include a sprung mass, such as a body or chassis, for example, and an unsprung mass, such as two or more axles or other wheel-engaging members, for example, with a suspension system disposed therebetween. Typically, a suspension system will include a plurality of spring devices as well as a plurality of damping devices that together permit the sprung and unsprung masses of the vehicle to move in a somewhat controlled manner relative to one another. Movement of the sprung and unsprung masses toward one another is normally referred to in the art as jounce motion while movement of the sprung and unsprung masses away from one another is commonly referred to in the art as rebound motion.

In some cases, the spring devices can take the form of gas spring assemblies that utilize pressurized gas as the working medium. Gas spring assemblies of various types, kinds and constructions are well known and commonly used. Typical gas spring assemblies can include a flexible wall that is secured between comparatively rigid end members. A wide variety of end member constructions have been developed and it is has been recognized that different end member constructions have different advantages and disadvantages. In many cases, a different end member construction may be selected and used on each of the two different ends of a gas spring assembly.

In some cases, it has been deemed desirable to reduce the overall weight of motor vehicle, such as to improve fuel efficiency and/or to increase the transportable payload for the same gross weight vehicle. Reducing the weight of one or more components of the pressurized gas system of vehicles can be one contributing factor to achieving such a goal. In many cases, conventional end members have been designed and constructed from metal materials to provide desired performance characteristics, such as strength, rigidity, and robustness of connection with the associated components and/or structures. Reducing the size of such components could be useful in contributing to the reduced weight of a vehicle suspension system, such as has been described above. However, it has been recognized that such size reductions can result in a corresponding reduction in performance.

Notwithstanding the widespread usage and overall success of conventional designs for end members of gas spring assemblies that are known in the art, it is believed that a need exists to meet these and/or other competing goals while still retaining comparable or improved performance, reducing cost of manufacture, improving ease of installation and/or otherwise advancing the art of gas spring devices.

BRIEF SUMMARY

One example of an end member assembly in accordance with the subject matter of the present disclosure that is dimensioned for securement to an end of an associated flexible spring member for forming an associated gas spring assembly can include an end member body and at least one connector fitting. The end member body can have a longitudinal axis and can extend between a first end and a second end that is spaced longitudinally from the first end. The end member body can include a base section and a cap section that are secured together at a single flowed-material joint. The base section and the cap section can together at least partially define a reservoir chamber within the end member body. At least one connector fitting can be at least partially embedded within the end member body such that a substantially fluid-tight joint is formed between the at least one connector fitting and at least one of the base section and the cap section. The base section can include a base section wall formed from a polymeric material. The base section wall can include an end wall portion oriented transverse to the longitudinal axis and disposed toward the second end of the end member body. An outer side wall portion can extend from an outer distal edge facing toward the first end of the end member body in a longitudinal direction toward the second end of the end member body. An inner side wall portion can extend longitudinally from along the end wall portion toward an inner distal edge facing toward the first end of the end member body. The cap section can be disposed toward the first end of the end member body relative to the base section. The cap section can include a cap section wall formed from a polymeric material. The cap section wall can include an end wall portion oriented transverse to the longitudinal axis. An outer side wall portion can extend from an outer distal edge facing the second end of the end member body in a longitudinal direction toward the end wall portion. A mounting wall portion can be disposed radially inward of the outer side wall portion and can extend from the end wall portion in a longitudinal direction opposite the outer side wall portion. The mounting wall portion can be dimensioned to receivingly engage the end of the associated flexible wall. The base section and the cap section can be positioned relative to one another such that the single flowed-material joint is formed between the outer distal edge of the outer side wall portion of the base section wall and the outer distal edge of the outer side wall portion of the cap section wall with the end wall portion of the cap section wall detachably supported on the inner distal edge of the inner side wall portion of the base section wall.

One example of a gas spring assembly in accordance with the subject matter of the present disclosure can include a flexible spring member having a longitudinal axis and extending peripherally about the longitudinal axis between opposing first and second ends to at least partially define a spring chamber. A first end member assembly can be secured across the first end of the flexible spring member. A second end member assembly according to the foregoing paragraph can be secured across the second end of the flexible spring member such that the spring chamber is at least partially defined by the flexible spring member between the first and second end member assemblies.

One example of a suspension system in accordance with the subject matter of the present disclosure can include a pressurized gas system that includes a pressurized gas source and a control device. The suspension system can also include at least one gas spring assembly according to the foregoing paragraph. The at least one gas spring assembly can be disposed in fluid communication with the pressurized gas source through the control device such that pressurized gas can be selectively transferred into and out of the spring chamber.

DETAILED DESCRIPTION

Turning now to the drawings, it is to be understood that the showings are for purposes of illustrating examples of the subject matter of the present disclosure and are not intended to be limiting. Additionally, it will be appreciated that the drawings are not to scale and that portions of certain features and/or elements may be exaggerated for purposes of clarity and/or ease of understanding.

Figure 1:
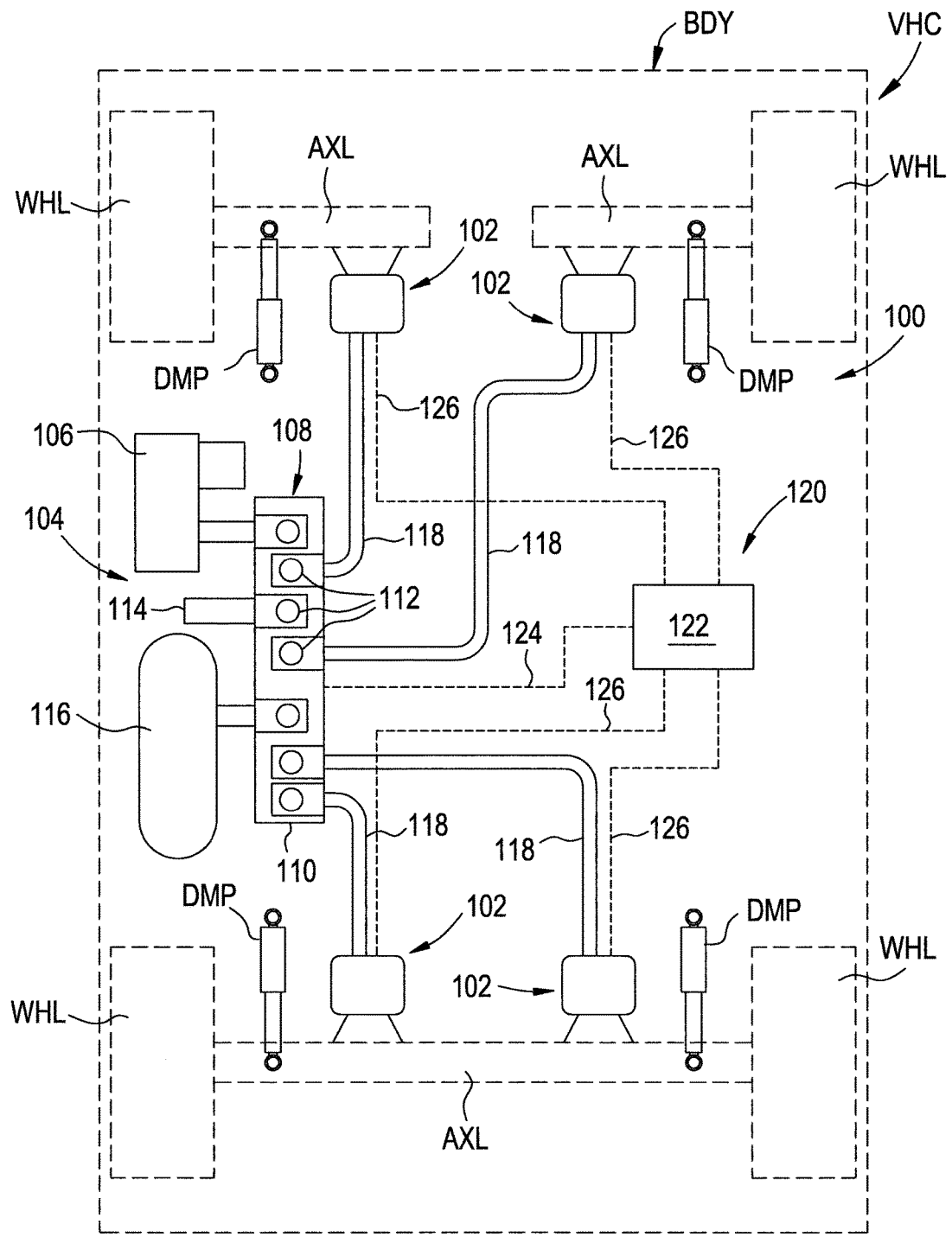
FIG. 1 is a schematic representation of one example of a suspension system of an associated vehicle including a gas spring assembly in accordance with the subject matter of the present disclosure.
Figure 2:
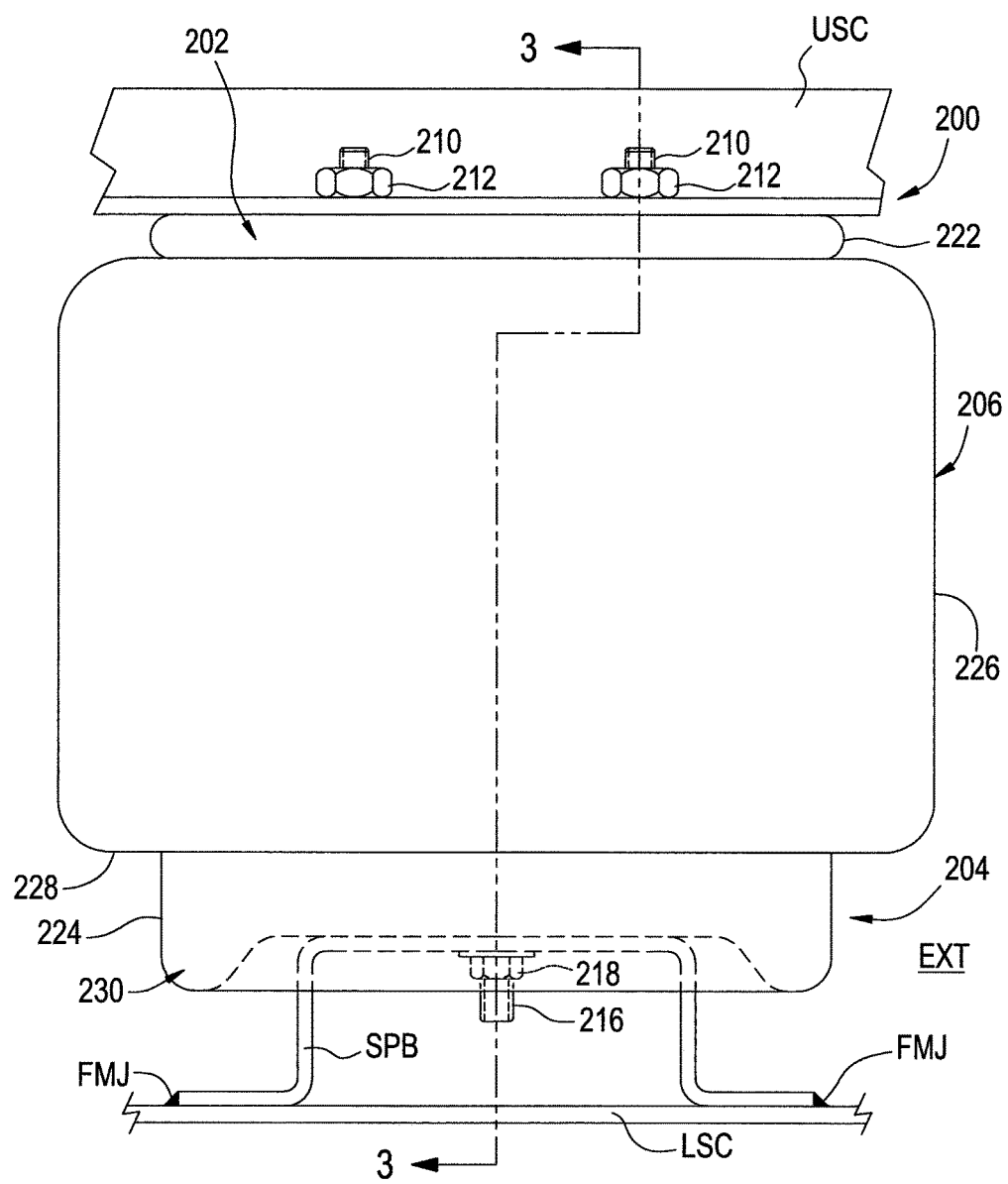
FIG. 2 is a side elevation view of one example of a gas spring assembly that includes one example of an end member in accordance with the subject matter of the present disclosure.

FIG. 1 illustrates one example of a suspension system 100 disposed between a sprung mass, such as an associated vehicle body BDY, for example, and an unsprung mass, such as an associated wheel WHL or an associated axle AXL, for example, of an associated vehicle VHC. It will be appreciated that any one or more of the components of the suspension system can be operatively connected between the sprung and unsprung masses of the associated vehicle in any suitable manner. Additionally, it will also be appreciated that such a suspension system of the vehicle can also, optionally, include a plurality of damping members, such as dampers DMP, for example, and that any such damping members can also be operatively connected between the sprung and unsprung masses of the associated vehicle in any suitable manner.

The suspension system can also include a plurality of gas spring assemblies supported between the sprung and unsprung masses of the associated vehicle. In the arrangement shown in FIG. 1, suspension system 100 includes four gas spring assemblies 102, one of which is disposed adjacent each corner of the associated vehicle adjacent a corresponding wheel WHL. However, it will be appreciated that any other suitable number of gas spring assemblies could alternately be used in any other configuration or arrangement. As shown in FIG. 1, gas spring assemblies 102 are supported between axles AXL and body BDY of associated vehicle VHC. Additionally, it will be recognized that the gas spring assemblies shown and described in FIG. 1 (e.g., gas spring assemblies 102) are illustrated as being of a rolling lobe-type construction. It is to be understood, however, that gas spring assemblies of other types, kinds and/or constructions could alternately be used.

Suspension system 100 also includes a pressurized gas system 104 operatively associated with the gas spring assemblies for selectively supplying pressurized gas (e.g., air) thereto and selectively transferring pressurized gas therefrom. In the exemplary embodiment shown in FIG. 1, pressurized gas system 104 includes a pressurized gas source, such as a compressor 106, for example, for generating pressurized air or other gases. A control device, such as a valve assembly 108, for example, is shown as being in communication with compressor 106 and can be of any suitable configuration or arrangement. In the exemplary embodiment shown, valve assembly 108 includes a valve block 110 with a plurality of valves 112 supported thereon. Valve assembly 108 can also optionally include a suitable exhaust, such as a muffler 114, for example, for venting pressurized gas from the system. Optionally, pressurized gas system 104 can also include a reservoir 116 in fluid communication with the compressor and/or valve assembly 108 and suitable for storing pressurized gas.

Valve assembly 108 is in communication with gas spring assemblies 102 through suitable gas transfer lines 118. As such, pressurized gas can be selectively transferred into and/or out of the gas spring assemblies through valve assembly 108 by selectively operating valves 112, such as to alter or maintain vehicle height at one or more corners of the vehicle, for example.

Suspension system 100 can also include a control system 120 that is capable of communication with any one or more systems and/or components (not shown) of vehicle VHC and/or suspension system 100, such as for selective operation and/or control thereof. Control system 120 can include a controller or electronic control unit (ECU) 122 communicatively coupled with compressor 106 and/or valve assembly 108, such as through a conductor or lead 124, for example, for selective operation and control thereof, which can include supplying and exhausting pressurized gas to and/or from gas spring assemblies 102. Controller 122 can be of any suitable type, kind and/or configuration.

Control system 120 can also, optionally, include one or more height (or distance) sensing devices (not shown in FIG. 1), such as, for example, may be operatively associated with the gas spring assemblies and capable of outputting or otherwise generating data, signals and/or other communications having a relation to a height of the gas spring assemblies or a distance between other components of the vehicle. Such height sensing devices can be in communication with ECU 122, which can receive the height or distance signals therefrom. The height sensing devices can be in communication with ECU 122 in any suitable manner, such as through conductors or leads 126, for example. Additionally, it will be appreciated that the height sensing devices can be of any suitable type, kind and/or construction.

One example of a gas spring assembly 200 in accordance with the subject matter of the present disclosure, such as may be suitable for use as one or more of gas spring assemblies 102 in FIG. 1, for example, is shown in FIGS. 2-5. Gas spring assembly 200 can have a longitudinally-extending axis AX (FIG. 3) and can include one or more end members, such as an end member (which may alternately be referred to herein as an end member assembly) 202 and an end member (which may alternately be referred to herein as an end member assembly) 204 that is spaced longitudinally from end member 202. A flexible spring member 206 can extend peripherally around axis AX and can be secured between the end members in a substantially fluid-tight manner such that a spring chamber 208 (FIG. 3) is at least partially defined therebetween.

Gas spring assembly 200 can be disposed between associated sprung and unsprung masses of an associated vehicle in any suitable manner. For example, one end member can be operatively connected to the associated sprung mass with the other end member disposed toward and operatively connected to the associated unsprung mass. In the embodiment shown in FIGS. 2 and 3, for example, end member 202 is secured along a first or upper structural component USC, such as associated vehicle body BDY in FIG. 1, for example, and can be secured thereon in any suitable manner. For example, one or more securement devices, such as mounting studs 210, for example, can be included along end member 202. In some cases, the one or more securement devices (e.g., mounting studs 210) can project outwardly from end member 202 and can be secured thereon in a suitable manner, such as, for example, by way of a flowed-material joint (not shown) or a press-fit connection (not identified). Additionally, such one or more securement devices can extend through mounting holes HLS in upper structural component USC and can receive one or more threaded nuts 212 or other securement devices, for example. As an alternative to one or more of mounting studs 210, one or more threaded passages (e.g., blind passages and/or through passages) could be used in conjunction with a corresponding number of one or more threaded fasteners.

Additionally, a fluid communication port, such as a transfer passage 214 (FIG. 3), for example, can optionally be provided to permit fluid communication with spring chamber 208, such as may be used for transferring pressurized gas into and/or out of the spring chamber, for example. In the exemplary embodiment shown, transfer passage 214 extends through at least one of mounting studs 210 and is in fluid communication with spring chamber 208. It will be appreciated, however, that any other suitable fluid communication arrangement could alternately be used.

End member assembly 204 can be secured along a second or lower structural component LSC, such as an axle AXL in FIG. 1, for example, in any suitable manner. As one example, a support bracket SPB can, optionally, be disposed along lower structural component LSC. If included, support bracket SPB can be secured on or along lower structural component LSC in any suitable manner, such as by way of one or more flowed-material joints FMJ, for example. Support bracket SPB can support end member assembly 204 in spaced relation to lower structural component LSC and can be secured therealong in any suitable manner. As one example, support bracket SPB can one or more mounting holes HLS extending therethrough. In such case, a threaded mounting stud 216 (or other threaded fastener) could extend through one of mounting holes HLS for engagement by an associated securement device, such as a threaded nut 218, for example, to secure the end member assembly on or along the support bracket and/or the lower structural component.

It will be appreciated that the one or more end members can be of any suitable type, kind, construction and/or configuration, and can be operatively connected or otherwise secured to the flexible wall in any suitable manner. In the exemplary arrangement shown in FIGS. 2-5, for example, end member 202 is of a type commonly referred to as a bead plate and is secured to a first end 220 of flexible spring member 206 using a crimped-edge connection 222. End member assembly 204 is shown in the exemplary arrangement in FIGS. 2-5 as being of a type commonly referred to as a piston (or a roll-off piston) that has an outer surface 224 that abuttingly engages an outer surface 226 of flexible spring member 206 such that a rolling lobe 228 is formed therealong. As gas spring assembly 200 is displaced between extended and collapsed conditions, rolling lobe 228 is displaced along outer surface 224 in a conventional manner.

Figure 3:
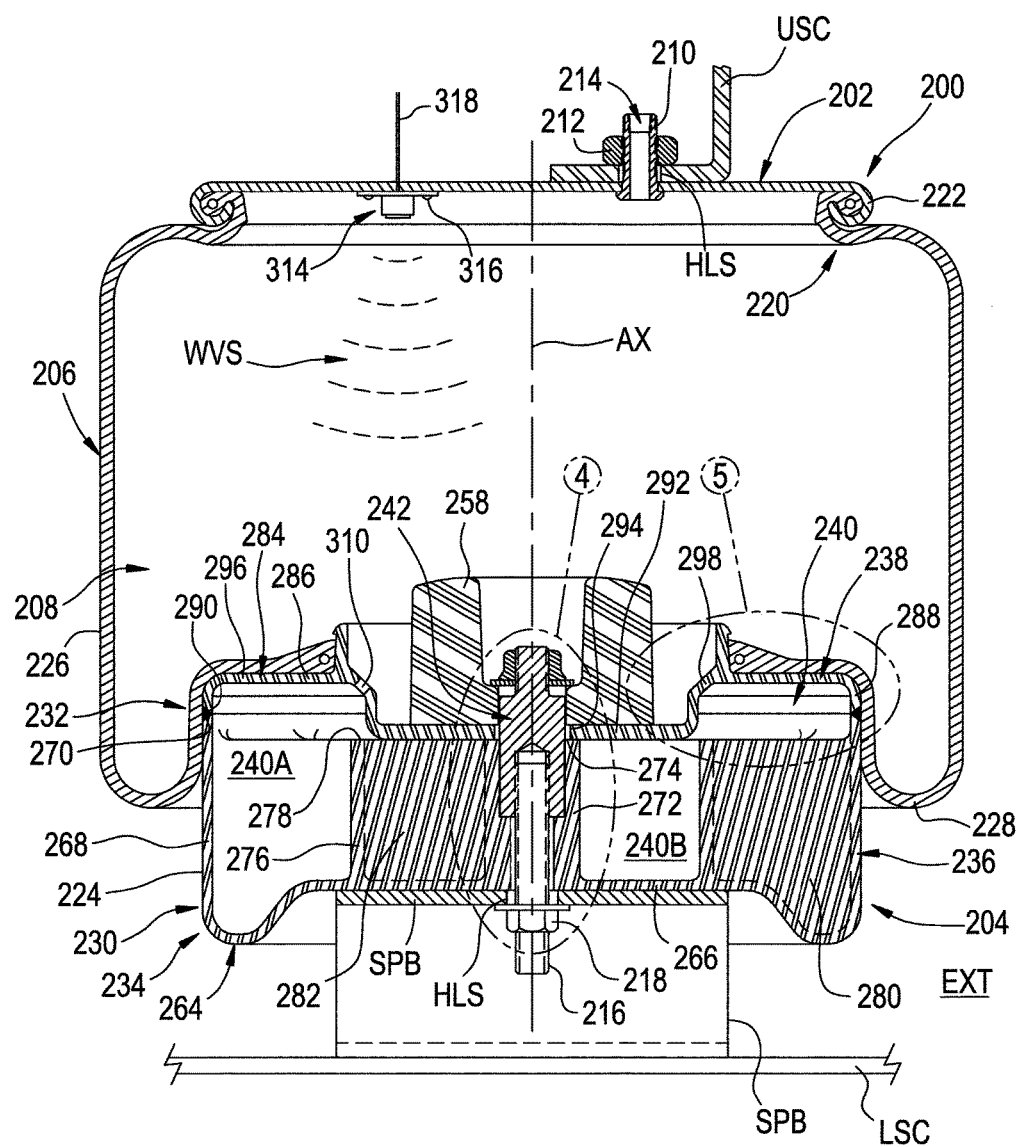
FIG. 3 is a side elevation view, in partial cross section, of the gas spring assembly in FIG. 2 taken from along line 3-3 in FIG. 2.
Figure 4:
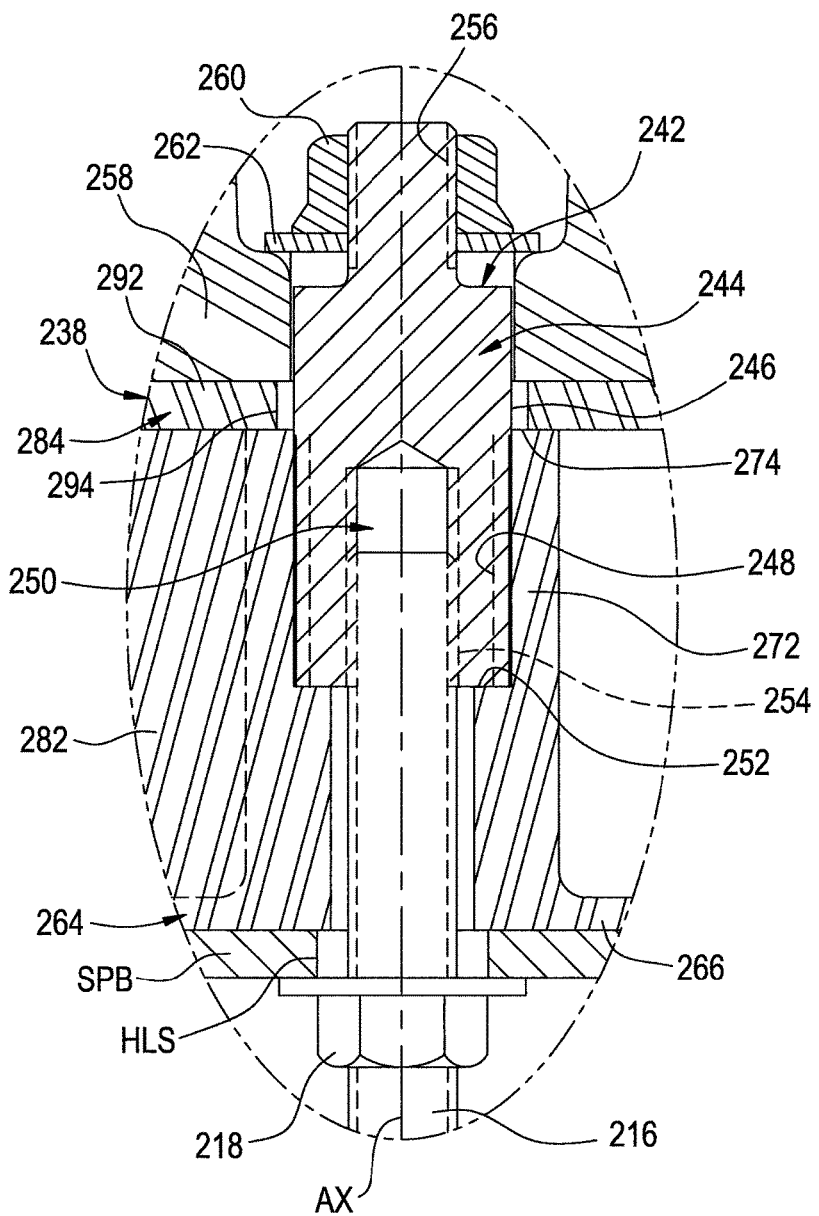
FIG. 4 is an enlarged view of the portion of the gas spring assembly identified as Detail 4 in FIG. 3.
Figure 5:
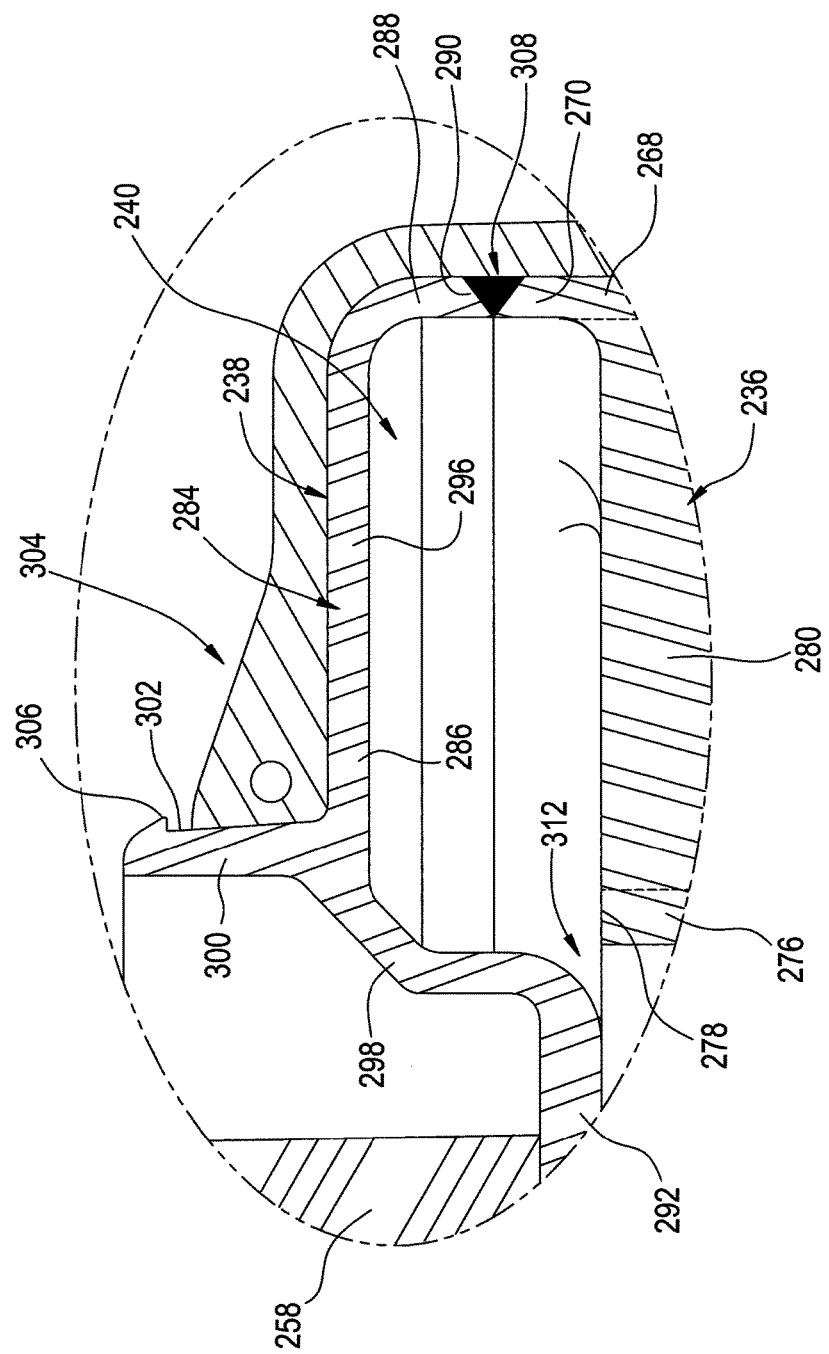
FIG. 5 is an enlarged view of the portion of the gas spring assembly identified as Detail 5 in FIG. 3.

As identified in FIGS. 3-5, end member assembly 204 includes an end member body 230 and extends from along a first or upper end 232 toward a second or lower end 234 that is spaced longitudinally from end 232. Body 230 includes a base section 236 and a cap section 238 that are secured together and at least partially define a reservoir chamber 240. End member assembly 204 also includes at least one connector fitting that is at least partially embedded within the end member assembly and accessible from along at least one of ends 232 and 234. In such case, the at least one connector fitting can be at least partially embedded in at least one of base section 236 and cap section 238 of end member body 230.

In a preferred arrangement, the at least one connector fitting can be accessible from along both ends and forms a substantially fluid-tight seal with at least one of base section 236 and cap section 238. In the construction shown in FIGS. 3-5, for example, a connector fitting 242 is included and, in a preferred embodiment, is at least partially embedded within one of the sections and forms a clearance (i.e., substantially non-contacting) fit with the other of sections 236 and 238. It will be appreciated, however, that two or more connector fittings could alternately be used in other constructions. In the arrangement shown in FIGS. 3-5, connector fitting 242 includes a fitting body 244 with an outer surface 246 that is at least partially embedded within one or more walls and/or wall portions of the at least one section of the end member body.

In some cases, outer surface 246 and/or any other external features of connector fitting 242 can include one or more features, characteristics and/or surface treatments suitable for promoting adhesion, retention and/or engagement of the material of end member body 230 with connector fitting 242, such as is represented by dashed lines 248, for example. Non-limiting examples of such features, characteristics and/or surface treatments can include any combination of annular grooves, annular ridges, one or more helical threads, knurl patterns, chemical adhesives, and/or bonding/sizing agents.

In cases in which a single connector fitting is included, connector fitting 242 can, in a preferred embodiment, form a substantially fluid-tight seal with at least one of sections 236 and 238. In such case, spring chamber 208 can be maintained in fluidic isolation relative to an external atmosphere EXT, such that the potential for pressurized gas loss from the spring chamber can be obviated or at least substantially reduced.

Additionally, connector fitting 242 can, in some cases, function to assist in securing the end member assembly on or along an associated structural component, such as providing a mounting and/or securement point for the end member assembly. It will be appreciated that any suitable configuration and/or combination of features and characteristics can be included on or along the connector fitting to perform such functions. As one example, connector fitting 242 can include a hole or opening 250 that can extend into the fitting body 244 from along an end surface 252. In some cases, the hole or opening could extend into and through the connector fitting such that the hole is accessible from along either end of the connector fitting. In a preferred arrangement, however, the hole can be a blind or non-through hole that can include a securement feature, such as one or more helical threads 254, for example that are accessible, such as by threaded stud 216, for example, from along end surface 252.

Furthermore, connector fitting 242 can include a securement feature 256, such as a projection or mounting stud with one or more helical threads, for example, that is/are accessible from along the end of the connector fitting opposite end surface 252. The fitting body of connector fitting 242 can be formed from any suitable material or combination of materials, such as one or more metal materials, for example. In the arrangement shown, connector fitting 242 can also function as a type of bumper mount and can, optionally, be dimensioned to receive a jounce bumper 258. If included, jounce bumper 258 can be secured on or along end member assembly 204 in any suitable manner, such as by way of a threaded fastener 260 and washer 262 operatively engaging securement feature 256 of connector fitting 242 and thereby capturing jounce bumper 258 in abutting engagement with end member assembly 204. As is well understood in the art, jounce bumpers of a wide variety of types, kinds and constructions can be used to inhibit contact between opposing parts during a full jounce (i.e., compressed) condition of the gas spring assembly.

Base section 236 of end member body 230 can include a base section wall 264 with an end wall portion 266 disposed toward end 234 and oriented transverse to axis AX. In a preferred arrangement, end wall portion 266 is dimensioned to abuttingly engage support bracket SBP and can support the end member assembly in spaced relation to lower structural component LSC. Base section wall 264 can also include an outer side wall portion 268 that extends from along end wall portion 266 toward an outer distal edge 270. Base section wall 264 can further include an inner side wall portion 272 that is disposed radially inward from outer side wall portion 268. Inner side wall portion 272 can extend from along end wall portion 266 axially toward an inner distal edge 274. In some cases, base section wall 264 can include an intermediate side wall portion 276 that extends axially from along end wall portion 266 to an intermediate distal edge 278. Furthermore, base section wall 264 can, optionally, include one or more support wall portions 280 that extend axially from along end wall portion 266 and radially inward from along outer side wall portion 268. Additionally, or in the alternative, base section wall 264 can, optionally, include one or more support wall portions 282 that extend axially from along end wall portion 266 radially outward from along inner side wall portion 272. Support wall portions 280 and/or 282 can be arranged or otherwise oriented in radially-spaced relation to one another about axis AX.

Cap section 238 can include a cap section wall 284 with an end wall portion 286 disposed toward end 232 and oriented transverse to axis AX. Cap section wall 284 can also include an outer side wall portion 288 that extend axially from along end wall portion 286 toward an outer distal edge 290. In some cases, end wall portion 286 can include an inner zone 292 that terminates at an inner edge 294 disposed in spaced relation to outer surface 246 of connector fitting 242. An outer zone 296 can be disposed radially outward from the inner zone and can be operatively connected thereto by a transition zone 298. In a preferred arrangement, outer zone 296 is axially offset from inner zone 292 such that cap section wall 284 is disposed in spaced relation to intermediate distal edge 278, if included.

In some case, cap section wall 284 can include an inner mounting wall portion 300 that extends axially beyond end wall portion 286 and extends peripherally about axis AX. Inner mounting wall portion 300 can have an outer surface 302 that is dimensioned to receive an end 304 of flexible spring member 206 such that a substantially fluid-tight seal can be formed therebetween. In some cases, a retaining ridge 306 can project radially outward from along the inner mounting wall portion and can extend peripherally along at least a portion thereof, such as may assist in retaining end 304 of flexible spring member 206 in abutting engagement on or along the end member.

Base section 236 and cap section 238 are oriented relative to one another such that inner zone 292 is supported on or along inner distal edge 274. In some cases, inner zone 292 can be detachably supported on the inner distal edge, such as by being captured between base section 236 and jounce bumper 258. It will be appreciated, however, that other configurations and/or arrangements could alternately be used. As such, it will be appreciated that base section 236 and cap section 238 can be secured to one another by way of a single flowed-material joint 308 to form end member body 230. In this respect, end member body 230 differs from conventional end member constructions in that include two sections commonly include at least two flowed-material joints. Such known constructions may be associated with increased costs of manufacture and/or reduced quality and/or performance due to the inclusion of such one or more additional flowed-material joints.

In an assembled condition, base section 236 and cap section 238 together at least partially define reservoir chamber 240, which is preferably substantially fluid tight and, together with spring chamber 208, capable of storing a quantity of pressurized gas for an extended period of time. Reservoir chamber 240 can be disposed in fluid communication with spring chamber 208 in any suitable manner, such as by one or one or more passages or openings 310 extending through end wall portion 266. As discussed above, in some cases, base section wall 264 can, optionally, include intermediate side wall portion 276 and/or one or more of support wall portions 280 and/or 282. In a preferred embodiment, inner zone 292, outer zone 296 and transition zone 298 of end wall portion 286 are disposed in spaced relation to intermediate distal edge 278 and support wall portions 280 and/or 282 such that a passage or gap 312 is formed between base section 236 and cap section 238. In such cases, reservoir chamber 240 can include an inner reservoir portion 240A disposed radially inward of intermediate side wall portion 276 and an outer reservoir portion 240B disposed radially outward thereof. If provided, gap 312 can permit chamber portions 240A and 240B to act as a substantially contiguous volume, which can, in some case, provide desirable performance characteristics to reservoir chamber 240.

In a preferred arrangement, an end member body of an end member assembly in accordance with the subject matter of the present disclosure (e.g., end member body 230 of end member assembly 204) can be at least partially formed from polymeric materials, such as by way of one or more processes that permit the features and elements described above to be integrally formed with other features of the end member assembly. It will be appreciated that the end member assembly can be formed from any suitable material or combination of materials. For example, end member assembly 204 can be at least partially formed from a substantially rigid polymeric material, such as a fiber-reinforced polypropylene, a fiber-reinforced polyamide, or an unreinforced (i.e., relatively high-strength) thermoplastic (e.g., polyester, polyethylene, polyamide, polyether or any combination thereof), for example.

It will be appreciated that flowed-material joint 308 can be formed in any suitable manner. As such, it will be appreciated that any suitable processes or joining techniques as well as any suitable geometric features corresponding to such processes and/or joining techniques can be used. Non-limiting examples of suitable joining processes and/or techniques can include spin welding, hot plate welding and ultrasonic welding.

A height or distance sensing device 314 is, optionally, shown in FIG. 3 as being disposed within spring chamber 208 along end member 202 and being secured thereto using suitable fasteners 316. Height sensing device 314 can be of any suitable type, kind and/or construction, such as an ultrasonic sensor that transmits and receives ultrasonic waves WVS (FIG. 3), for example. Additionally, it will be appreciated that height sensing device 314 can be connected to other systems and/or components of a vehicle suspension system in any suitable manner. As shown in FIG. 3, height sensing device 314 includes a lead or connection 318 that can be used for such communication purposes, such as is indicated by leads 126 of control system 120 in FIG. 1, for example.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood that claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. An end member assembly dimensioned for securement to an end of an associated flexible spring member for forming an associated gas spring assembly, said end member assembly comprising:
   an end member body having a longitudinal axis and extending between a first end and a second end spaced longitudinally from said first end, said end member body including a base section and a cap section that are secured together at a single flowed-material joint, said base section and said cap section together at least partially defining a reservoir chamber within said end member body; and,
   at least one connector fitting partially embedded within one of said base section and said cap section of said end member body such that said at least one connector fitting is axially coextensive with at least a portion of said base section and at least a portion of said cap section, said at least one connector fitting forming a substantially fluid-tight joint with one of said base section and said cap section while having a clearance fit with the other of said base section and said cap section;
   said base section including a base section wall formed from a polymeric material, said base section wall including an end wall portion oriented transverse to said longitudinal axis and disposed toward said second end of said end member body, an outer side wall portion extending from an outer distal edge facing toward said first end of said end member body in a longitudinal direction toward said second end of said end member body, and an inner side wall portion extending longitudinally from along said end wall portion toward an inner distal edge facing toward said first end of said end member body;

said cap section disposed toward said first end of said end member body relative to said base section, said cap section including a cap section wall formed from a polymeric material, said cap section wall including an end wall portion oriented transverse to said longitudinal axis, an outer side wall portion extending from an outer distal edge facing said second end of said end member body in a longitudinal direction toward said end wall portion, and a mounting wall portion disposed radially inward of said outer side wall portion and extending from said end wall portion in a longitudinal direction opposite said outer side wall portion and dimensioned to receivingly engage the end of the associated flexible wall;

said base section and said cap section positioned relative to one another such that said single flowed-material joint is formed between said outer distal edge of said outer side wall portion of said base section wall and said outer distal edge of said outer side wall portion of said cap section wall with said end wall portion of said cap section wall detachably supported on said inner distal edge of said inner side wall portion of said base section wall.

2. An end member assembly according to claim 1, wherein at least one of said base section wall and said cap section wall includes one or more passages extending therethrough in fluid communication with said reservoir chamber.

3. An end member assembly according to claim 1, wherein said base section wall includes an intermediate side wall portion extending longitudinally from along said end wall portion toward an intermediate distal edge facing toward said first end of said end member body.

4. An end member assembly according to claim 3, wherein intermediate side wall portion separates said reservoir chamber into an inner chamber section and an outer chamber section disposed in fluid communication with said inner chamber section.

5. An end member assembly according to claim 3, wherein said intermediate distal edge is disposed in spaced relation to said end wall portion of said cap section wall such that a passage is formed therebetween.

6. An end member assembly according to claim 1, wherein said end wall portion of said cap section wall includes an inner end wall portion disposed in abutting engagement with said inner distal edge of said base section wall and an outer end wall portion disposed in axially-spaced relation to said base section wall.

7. An end member assembly according to claim 1, wherein said base section wall includes a plurality of support wall portions extending radially inward from along said outer side wall portion.

8. An end member assembly according to claim 1, wherein said base section wall includes a plurality of support wall portions extending radially outward from along said inner side wall portion.

9. An end member assembly according to claim 1, wherein said at least one connector fitting includes a first securement feature accessible from along said first end of said end member body and a second securement feature accessible from along said second end of said end member body.

10. An end member assembly according to claim 1, wherein said at least one connector fitting forms said substantially fluid-tight joint with said base section and said at least one connector fitting forms said clearance fit with said cap section.

11. An end member assembly according to claim 1, wherein said cap section includes an inner zone having an inner edge, and said clearance fit is between said inner edge and said at least one connector fitting.

12. An end member assembly according to claim 1, wherein said cap section includes an inner edge defining a cap opening extending completely through said cap section in a longitudinal direction, and said at least one connector fitting extends through a longitudinal entirety of said cap opening.

13. A gas spring assembly comprising:
a flexible spring member having a longitudinal axis and extending peripherally about said longitudinal axis between a first end and a second end to at least partially define a spring chamber;
a first end member secured across said first end of said flexible spring member; and,
a second end member secured across said second end of said flexible spring member such that said spring chamber is at least partially defined by said flexible spring member between said first and second end members, said second end member including:
an end member body extending between a first end and a second end spaced longitudinally from said first end, said end member body including a base section and a cap section that are secured together at a single flowed-material joint, said base section and said cap section together at least partially defining a reservoir chamber within said end member body; and,
at least one connector fitting partially embedded within one of said base section and said cap section of said end member body such that said at least one connector fitting is axially coextensive with at least a portion of said base section and at least a portion of said cap section, said at least one connector fitting forming a substantially fluid-tight joint with one of said base section and said cap section while having a clearance fit with the other of said base section and said cap section.

14. A gas spring assembly according to claim 13, wherein said spring chamber is disposed in fluid communication with said reservoir chamber of said end member assembly.

15. A gas spring assembly according to claim 13 further comprising a jounce bumper disposed in abutting engagement with said cap section wall of said end member assembly and secured to said at least one connector fitting for retention on said end member assembly.

16. A gas spring assembly according to claim 13 further comprising a support bracket operatively connected to said end member assembly opposite said flexible spring member such that said end member assembly can be supported in spaced relation to an associated structural component.

17. A suspension system comprising:
a pressurized gas system including a pressurized gas source and a control device; and,
at least one gas spring assembly according to claim 13, said at least one gas spring assembly being disposed in fluid communication with said pressurized gas source through said control device such that pressurized gas can be selectively transferred into and out of at least said spring chamber.

18. An end member dimensioned for securement to an associated flexible spring member, said end member comprising:

an end member body having a longitudinal axis and extending between a first end and a second end spaced longitudinally from said first end, said end member body including a base section and a cap section that are secured together at a single flowed-material joint, said base section and said cap section together at least partially defining a reservoir chamber within said end member body; and, a connector fitting partially embedded within one of said base section and said cap section of said end member body such that said connector fitting is axially coextensive with at least a portion of said base section and at least a portion of said cap section, said connector fitting forming a substantially fluid-tight joint with one of said base section and said cap section while having a clearance fit with the other of said base section and said cap section.

19. An end member according to claim 18, wherein said cap section includes an inner zone having an inner edge, and said clearance fit is between said inner edge and said connector fitting.

20. An end member assembly according to claim 18, wherein said cap section includes an inner edge defining a cap opening extending completely through said cap section in a longitudinal direction, and said connector fitting extends through a longitudinal entirety of said cap opening.

* * * * *